(12) United States Patent
Camuffo et al.

(10) Patent No.: US 8,620,241 B2
(45) Date of Patent: *Dec. 31, 2013

(54) METHOD AND APPARATUS FOR OPTIMIZING OUTPUT POWER LEVELS IN POWER AMPLIFIERS

(75) Inventors: Andrea Camuffo, Munich (DE); Andreas Langer, Unterschleissheim-Lohhof (DE)

(73) Assignee: Intel Mobil Communications GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/400,281

(22) Filed: Feb. 20, 2012

(65) Prior Publication Data

US 2012/0149442 A1    Jun. 14, 2012

Related U.S. Application Data

(63) Continuation of application No. 13/196,150, filed on Aug. 2, 2011, now Pat. No. 8,145,159, and a continuation of application No. 11/757,047, filed on Jun. 1, 2007, now Pat. No. 8,014,738.

(60) Provisional application No. 60/863,483, filed on Oct. 30, 2006.

(51) Int. Cl.
*H01Q 11/12* (2006.01)

(52) U.S. Cl.
USPC ............ 455/127.1; 55/127.3; 55/522; 55/572

(58) Field of Classification Search
USPC .................................................. 455/127.1
See application file for complete search history.

(56) References Cited

U.S. PATENT DOCUMENTS

| | | | |
|---|---|---|---|
| 5,977,831 A | 11/1999 | Davis et al. | |
| 7,218,951 B2 * | 5/2007 | Rozenblit et al. | 455/522 |
| 2003/0155978 A1 * | 8/2003 | Pehlke | 330/296 |
| 2004/0248516 A1 | 12/2004 | Demir et al. | |
| 2006/0019621 A1 * | 1/2006 | Yamaguchi | 455/127.1 |
| 2006/0160505 A1 * | 7/2006 | Ichitsubo et al. | 455/127.1 |
| 2007/0049219 A1 | 3/2007 | Demir et al. | |
| 2007/0243898 A1 * | 10/2007 | Eyre et al. | 455/552.1 |
| 2010/0291887 A1 * | 11/2010 | Chan et al. | 455/127.1 |

OTHER PUBLICATIONS

Prosecution History from U.S. Appl. No. 11/757,047, filed Jun. 1, 2007, including the following documents and the associated cited documents and content of said documents, Mar. 4, 2010 List of references; Mar. 4, 2010 Non-Final Rejection; Oct. 13, 2010 List of references; and Oct. 13, 2010 Final Rejection.

* cited by examiner

*Primary Examiner* — Ajibola Akinyemi
(74) *Attorney, Agent, or Firm* — SprylP, LLC

(57) ABSTRACT

Some embodiments discussed relate to an apparatus comprising a power amplifier module. The power amplifier module includes a plurality of sensors, and a first digital communication port configured to provide a monitor signal from at least one of the plurality of sensors. The apparatus includes a transceiver module coupled to provide an signal to an input of the power amplifier the transceiver module including a second digital communication port configured to receive the monitor signal from the first digital communication port, a processing unit configured to generate at least one of a bias control signal and a back-off signal dependent upon the monitor signal, and a power controller to receive the at least one of bias control signal and the back-off signal and provide at least one further input signal to the power amplifier based on at least one of the bias control signal and the back-off signal.

27 Claims, 2 Drawing Sheets

METHOD AND APPARATUS FOR OPTIMIZING OUTPUT POWER LEVELS IN POWER AMPLIFIERS

RELATED APPLICATIONS

This application is a Continuation of co-pending U.S. patent application Ser. No. 13/196,150, which has a filing date of Aug. 2, 2011. Application Ser. No. 13/196,150 claims priority benefit and is a Continuation of application Ser. No. 11/757,047, which was filed on Jun. 1, 2007. Application Ser. No. 11/757,047 claims benefit of U.S. Provisional Patent Application No. 60/863,483, filed on Oct. 30, 2006. The entire contents of the foregoing prior filed Applications are hereby incorporated herein by reference.

BACKGROUND

Global System for Mobile Communications (GSM) is one of the standards used for mobile phones. Gaussian Minimum Shift Keying (GMSK) is a type of continuous-phase frequency-shift keying used in GSM. Enhanced Data rates for GSM Evolution (EDGE) is a digital mobile technology used in conjunction with GSM to provide packet-switched applications such as internet connection. EDGE additionally uses 8 phase-shift keying (8PSK) as part of the modulation and coding scheme.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
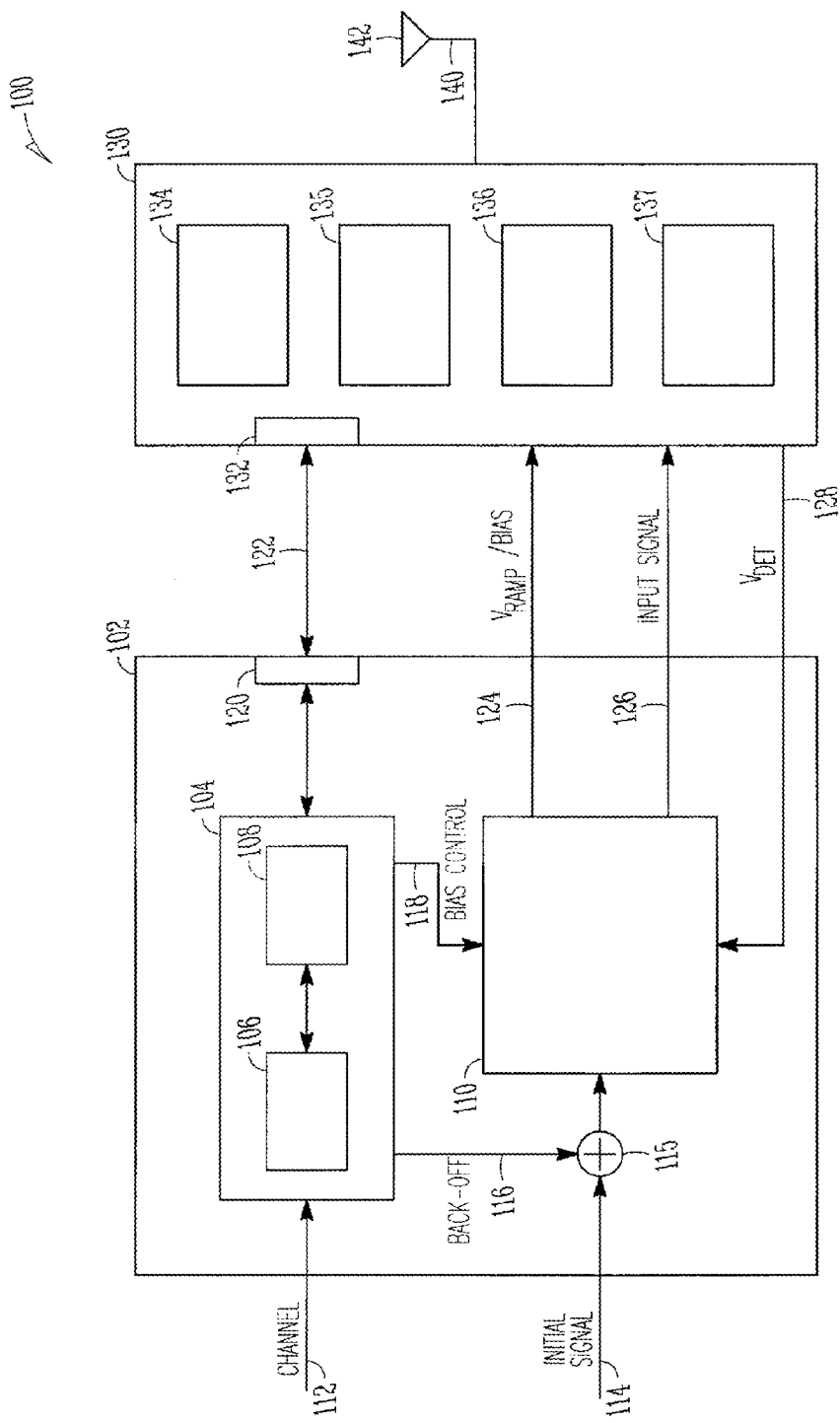
FIG. 1 illustrates a schematic view of an apparatus for optimizing the output power levels of power amplifiers, according to some embodiments of the invention.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The growth and use of radio-frequency devices (such as hand-held devices) with increasing functional capabilities (e.g., voice, video, and data) has resulted in a greater demand for efficient power-saving techniques to increase the battery life in these devices. Energy-efficient linear power amplifiers are essential components in mobile battery operated systems having wireless connectivity, e.g cellular phones, personal digital assistants (PDAs).

Linearity in power amplifiers is a fundamental requirement for the operation of 8PSK based modulation schemes in mobile handsets. Any amplitude distortion of the signal envelope produces two unacceptable phenomena. Firstly, the spectrum of the signal is widened (also known as spectral re-growth). This widening effect can cause the signal to fail the prescribed modulation mask, a requirement set by the GSM standards to prevent interference to neighboring channels. Secondly, a simple distortion of the modulation constellation results in a lowered signal to noise ratio at the receiver. The GSM standards define an error vector magnitude (EVM) specification, which is a measure of the difference between the transmitted signal and an ideal one. In practice, imperfections in the modulator, other transmitter stages and non-linearity in the power amplifier can consume a significant fraction of the EVM budget.

In applications like the EDGE standard, a modified 8PSK modulation scheme is used where as a result of base-band filtering, the final modulation signal is also amplitude modulated which means a non-constant envelope is present. Consequently, due to the presence of a non-constant envelope, the spectrum at the output of power amplifier strongly depends on the linearity of the power amplifier used. Hence, it is desired to have power amplifiers used in applications having 8PSK modulation schemes to be optimized in order to meet the stringent linearity requirements. Moreover, it is desired to limit the maximum power amplifier current in applications using GMSK as the modulation scheme. Furthermore, it is also desired to prevent power amplifiers from breakdown due to excessive heat.

In some embodiments, since mobile devices using EDGE technology support two types of modulation schemes, the power amplifiers are also required to support two different working modes in such devices.

In a GMSK modulation scheme, the modulation is of constant envelope type. Here, the linearity of the power amplifier does not corrupt the modulation quality and it is therefore not an issue (as long as the harmonics stay below a certain threshold). However, the requirement on maximum power is important, because of the presence of (1) high peak currents and (2) greater heat generation within the power amplifier. Most handset manufacturers desire to have the maximum current drawn by the power amplifier to be limited. This would enable in maximizing the talk time and avoiding abrupt self switching-off of the mobile due to the drop in battery voltage.

On the other hand, in 8PSK the linearity plays a big role, since a non linear power amplifier generates unwanted sidelobes next to the active channel which can violate the European Telecommunications Standard Institute (ETSI) requirement on spectrum purity. It is therefore important to back-off the transmitting power when the power amplifier is operating in a region where the nonlinearity is too strong.

However, both maximum current (consequently, the heat generation) and linearity strongly depend upon the actual working conditions and parameters of the power amplifier, especially the parameters such as instantaneous load, temperature and supply voltage. In order to optimize the system performance, it is desirable to make the back-off dependent on actual load condition, so that an unnecessarily large back-off is avoided. Additionally, having a large back-off may lead to using bigger power amplifiers with lower efficiency.

In some embodiments, since the load condition depends heavily on the actual frequency, a system and method to pair the back-off or biasing conditions with the frequency is used. In some embodiments, such a system that pairs the back-off with the frequency is particularly useful when the mobile system is operating in frequency-hopping mode in which case the channel is continuously changed. In some embodiments, the system works on slot basis where the system detects the state of the power amplifier after a burst and takes appropriate action for the next set of bursts. By implementing this system, an improved power amplifier working condition along with a better switching spectrum is achieved.

In some embodiments the power amplifier has a power detector. In some embodiments, power amplifier has sensors including internal current sensors, temperature sensors, and linearity sensors. In some embodiments, a digital information from sensors is sent from the power amplifier to the transceiver using a digital communication link between digital communication ports located within the transceiver and power amplifier, respectively.

In some embodiments, after the transmission of either a GMSK or 8PSK slot, the transceiver activates the digital link to the power amplifier in order to monitor its status. In some embodiments, the status report indicates the temperature at power amplifier and whether a maximum current threshold has been overtaken (e.g., in the case of GMSK) or whether the linearity of power amplifier was not good enough (e.g., in the case of 8PSK). In some embodiments, the status report may also include the amount of battery power remaining. In some embodiments, information regarding the amount of remaining battery power is evaluated directly at the transceiver.

In some embodiments, one of two modes are available (i) either to set a maximum current or (ii) to provide linearity. In some embodiments, for subsequent transmission operations on a particular channel, the maximum power is limited (e.g., in the case GMSK) or the bias condition of the power amplifier is changed (e.g., in the case of 8PSK).

In some embodiments, it may also be necessary to back off the power if the temperature of the power amplifier is too high (to avoid burn up of the device) or if the battery voltage is below a certain threshold (this could happen regardless of the particular frequency being used).

FIG. 1 is a schematic view of apparatus 100 for optimizing the output power level of power amplifiers, according to some embodiments of the invention. Apparatus 100 includes an RF transceiver module 102, and a power amplifier module 130. Power amplifier module 130 is electrically coupled to an antenna 142 using a link 140. RF transceiver 102 includes a processing circuit 104, a power controller 110, a summing circuit 115 and a digital port interface 120. Processing circuit 104 includes a processor 106 and a memory 108. Power amplifier 130 includes a digital port interface 132, a temperature sensor 134, an internal current sensor 135, a linearity sensor 136, and a power detector 137. Digital port interface 120 of RF transceiver 102 and the digital port interface 132 of power amplifier 130 are coupled using a digital communication link 122.

Sensor information related to conditions experienced by power amplifier module 130 as measured by 134, 135, 136, and 137 is communicated from power amplifier 130 to RF transceiver 102 using digital port interfaces 120, 132 and digital communication link 122. In some embodiments, digital port interface 120 is a serial port interface (SPI).

Summing circuit 115 receives an initial signal on line 114 generated at a baseband circuit module (not shown) and a back-off signal on line 116 generated at processing circuit 104. Summing circuit 115 combines the signals on lines 114 and 116 and sends the combined signal to power controller 110, which in turn provides an input signal on line 126 to power amplifier module 130. Input signal on line 126 is received at an input terminal of power amplifier 130. Additionally, processing circuit 104 generates a bias control signal on line 118 based on power amplifier operating information received at processing circuit 104 from sensors 134, 135, 136, and 137. A bias control signal provided on line 118 is received at power controller 110. Based on the bias control signal on line 118, power controller 110 communicates to power amplifier 130 a $V_{RAMP/Bias}$ voltage signal on line 124. Additionally, power amplifier 130 provides a feedback signal $V_{DET}$ on line 128 back to power controller 110. In some embodiments the $V_{DET}$ signal is a feedback signal and $V_{RAMP/Bias}$ changes the gain of RF power amplifier 130.

Figures 2, 3:
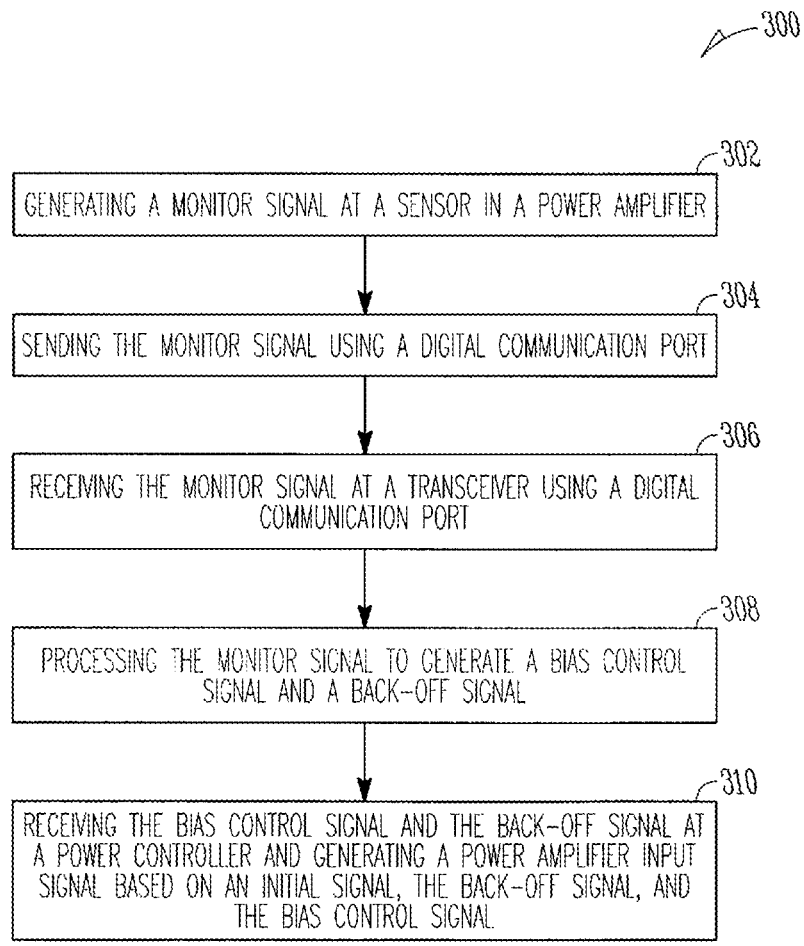
FIG. 2 illustrates a table showing various power control parameter stored for each transmission channel, according to some embodiments of the invention.
FIG. 3 shows a method for optimizing the output power levels of power amplifiers, according to some embodiments of the invention.

FIG. 2 illustrates a table 200 showing various power control parameters stored for each transmission channel, according to some embodiments of the invention. Row 202 shows the temperature of power amplifier 130 sensed by temperature sensor 134. Row 204 lists channels used for frequency-hopping. Row 206 corresponds to the back-off voltages to be applied to the initial signal on line 114 for each corresponding channel listed in row 204. Row 208 lists the bias voltages of bias control signal in line 118 for each corresponding channel listed in row 204. In some embodiments, the output power of power amplifier 130 is controlled based on the values of bias voltages and back-off voltages.

In some embodiments, the RF transceiver 102 maintains a table 200 (shown in FIG. 2) with the necessary back-off and biasing conditions determined for each of the channels used for transmission. In some embodiments, the dimension of this table (maximum number of channels) depends on the maximum number of the different frequencies used in a frequency hopping scenario. In some embodiments, the back-off can be gradually increased or reduced over many bursts (with or without hysteretic behavior) according to whether the sensors measuring the linearity, the over-current, or the over-temperature remain active or not.

In some embodiments, the transceiver optimizes the power amplifier output power and/or the power amplifier biasing conditions according to digital information gathered through a digital link between power amplifier and transceiver. In some embodiments (e.g., in the case of GMSK), the output power of the power amplifier is reduced depending on the status of the current sensor, or if the maximum temperature is exceeded. In some embodiments (e.g., in the case of 8PSK), the bias voltage to the power amplifier is changed upon sensing an increase in quiescent current and the linearity sensor reports bad linearity. In some embodiments, a table is used to store the necessary back off and biasing condition for different channels. Storing the back-off and biasing conditions improves system performances in a frequency-hopping scenario. In some embodiments, the back off or biasing increase is performed only on those channels where it is really necessary.

FIG. 3 shows a method 300 for optimizing the output power levels of power amplifiers, according to some embodiments of the invention.

At block 302, the apparatus is generating a monitor signal at a sensor in a power amplifier. At block 304, the action is sending the monitor signal using a digital communication port to a transceiver. At block 306, the action is receiving the monitor signal at a transceiver using a digital communication port. At block 308, the action is processing the monitor signal to generate a bias control signal and a back-off signal. At block 310, the action is receiving the bias control signal and the back-off signal at a power controller. The power controller is generating a power amplifier input signal based on an initial signal, the back-off signal, and the bias control signal.

The system for controlling output power disclosed in this invention is suitable for applications in various wireless data and voice communications standard and protocols, including GSM, General Packet Radio Service (GPRS), Code Division Multiple Access (CDMA), IEEE 802.11 and others. In addition, the system discussed may be used in a wide range of wireless communication devices such as cellular phone, mobile computers, and other handheld wireless digital devices.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent to those of skill in the art upon reviewing the above description. In the previous discussion and in the claims, the terms "including" and "comprising" are used in an open-ended fashion, and thus should be interpreted to mean "including, but not limited to . . . ."

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. An apparatus comprising:
a power amplifier including at least one sensor to provide a monitor signal; and
a transceiver coupled to provide a signal to an input of the power amplifier, the transceiver including:
a processing unit configured to generate a bias control signal and a power adjusting signal based on the monitor signal,
a summing circuit configured to combine the power adjusting signal and another signal to provide a combined signal, and
a power controller to receive the combined signal and provide an input signal to the power amplifier based on the combined signal.

2. The apparatus of claim 1, wherein the at least one sensor is a temperature sensor, an internal current sensor, a linearity sensor, or a power sensor.

3. The apparatus of claim 1, wherein the at least one sensor includes a memory to store a table including a plurality of power adjusting signals and a plurality of biasing signals.

4. The apparatus of claim 3, wherein each of the plurality of power adjusting signals and the plurality of biasing signals corresponds to different communication channels.

5. The apparatus of claim 1, further comprising an antenna adapted to send and receive signals from the transceiver.

6. The apparatus of claim 1, wherein the at least one sensor is a plurality of sensors.

7. The apparatus of claim 1, wherein the power controller is configured to receive a feedback signal from the power amplifier.

8. The apparatus of claim 1, wherein the power amplifier and the transceiver are distinct modules.

9. The apparatus of claim 1, wherein the power amplifier and the transceiver are incorporated in a common apparatus.

10. A method comprising:
receiving a monitor signal, the monitor signal generated by at least one sensor;
processing the monitor signal and generating a bias control signal and a power adjusting signal based on the monitor signal; and
receiving the bias control signal and the power adjusting signal and generating an input signal for a power amplifier based on an initial signal, the power adjusting signal and the bias control signal.

11. The method of claim 10, further comprising generating the monitor signal from at least one sensor.

12. The method of claim 10, further comprising storing the bias control signal and the power adjusting signal corresponding to a particular frequency channel in a memory.

13. The method of claim 12, further comprising using the stored bias control signal and the power adjusting signal corresponding to the particular frequency for subsequent burst of transmission in a frequency-hop application.

14. The method of claim 10, wherein storing the bias control signal and the power adjusting signal includes storing the bias control signal and the power adjusting signal for different communication channels in a table within a memory.

15. The method of claim 10, wherein generating a monitor signal from the at least one sensor includes generating a monitor signal from a temperature sensor, an internal current sensor, a linearity sensor, or a power sensor.

16. The method of claim 10, further comprising combining the power adjusting signal and the initial signal and providing the combined signal to a power controller.

17. The method of claim 10, further comprising receiving a feedback signal from a power amplifier at a power controller.

18. A system comprising:
a power amplifier including at least one sensor to provide a monitor signal; and
a transceiver coupled to an input of the power amplifier, the transceiver configured to:
receive the monitor signal,
generate a bias control signal and a power adjusting signal based on the monitor signal,
combine the power adjusting signal and another signal to generate a combined signal and provide the combined signal to a power controller, and
provide an input signal to the power amplifier based on the combined signal.

19. The system of claim 18, wherein the at least one sensor includes a temperature sensor, an internal current sensor, a linearity sensor, or a power sensor.

20. The system of claim 18, wherein the processing unit further comprises a memory to store a table including a plurality of power adjusting signals and a plurality of biasing signals.

21. The system of claim 20, wherein each of the plurality of power adjusting signals and the plurality of biasing signals corresponds to different communication channels.

22. The system of claim 18, further comprising an antenna adapted to send and receive signals from the transceiver.

23. The apparatus of claim 18, wherein the at least one sensor is a plurality of sensors.

24. An apparatus comprising:
a transceiver, including:
a processing unit configured to generate a bias control signal and a power adjusting signal based on a monitor signal,
a summing circuit configured to combine the power adjusting signal and another signal and provide a combined signal, and
a power controller to receive the combined signal and provide a power controller signal based on the combined signal.

25. The apparatus of claim 24, further comprising a power amplifier coupled to the transceiver, the power amplifier to provide the monitor signal and receive the power controller signal.

26. The apparatus of claim 24, further comprising sensor coupled to the transceiver, the sensor to provide the monitor signal.

27. The apparatus of claim 26, wherein the sensor is at least one of a temperature sensor, an internal current sensor, a linearity sensor, or a power sensor.

* * * * *